United States Patent
Bennett et al.

(10) Patent No.: US 8,912,778 B1
(45) Date of Patent: Dec. 16, 2014

(54) SWITCHING VOLTAGE REGULATOR EMPLOYING CURRENT PRE-ADJUST BASED ON POWER MODE

(75) Inventors: George J. Bennett, Murrieta, CA (US); Steven R. Vasquez, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1320 days.

(21) Appl. No.: 12/534,072

(22) Filed: Jul. 31, 2009

(51) Int. Cl.
    *G05F 1/00* (2006.01)

(52) U.S. Cl.
    USPC .......................................... 323/283

(58) Field of Classification Search
    USPC ................. 323/224, 288, 351, 282–285
    See application file for complete search history.

(56) References Cited

U.S. PATENT DOCUMENTS

| | | | |
|---|---|---|---|
| 4,164,648 A | 8/1979 | Chu | |
| 4,298,898 A | 11/1981 | Cardot | |
| 4,675,617 A | 6/1987 | Martin | |
| 4,737,670 A | 4/1988 | Chan | |
| 4,822,144 A | 4/1989 | Vriens | |
| 4,922,141 A | 5/1990 | Lofgren et al. | |
| 5,134,355 A * | 7/1992 | Hastings | 323/211 |
| 5,146,121 A | 9/1992 | Searles et al. | |
| 5,386,187 A | 1/1995 | Bichler et al. | |
| 5,440,250 A | 8/1995 | Albert | |
| 5,440,520 A | 8/1995 | Schutz et al. | |
| 5,446,718 A | 8/1995 | Shimizu et al. | |
| 5,459,438 A | 10/1995 | Mirow | |
| 5,479,119 A | 12/1995 | Tice et al. | |
| 5,545,977 A * | 8/1996 | Yamada et al. | 323/313 |
| 5,612,610 A | 3/1997 | Borghi et al. | |
| 5,629,610 A | 5/1997 | Pedrazzini et al. | |
| 5,638,019 A | 6/1997 | Frankeny | |
| 5,640,383 A | 6/1997 | Kamoto et al. | |
| 5,661,422 A | 8/1997 | Tice et al. | |
| 5,668,508 A * | 9/1997 | Pulvirenti et al. | 331/111 |
| 5,717,683 A | 2/1998 | Yoshimoto et al. | |
| 5,747,976 A | 5/1998 | Wong et al. | |
| 5,748,050 A | 5/1998 | Anderson | |
| 5,777,567 A | 7/1998 | Murata et al. | |
| 5,787,292 A | 7/1998 | Ottesen et al. | |
| 5,808,455 A | 9/1998 | Schwartz et al. | |
| 5,815,043 A | 9/1998 | Chow et al. | |
| 5,994,885 A | 11/1999 | Wilcox et al. | |
| 6,031,426 A | 2/2000 | Yechuri | |

(Continued)

FOREIGN PATENT DOCUMENTS

WO    90/13079    11/1990

OTHER PUBLICATIONS

Wei, et al., "A Variable-Frequency Parallel I/0 Interface with Adaptive Power-Supply Regulation", Nov. 2000, IEEE, Journal of Solid-State Circuits vol. 35, No. 11, pp. 1600-1610.

(Continued)

*Primary Examiner* — Adolf Berhane
*Assistant Examiner* — Henry Lee, III

(57) ABSTRACT

A switching voltage regulator is disclosed including a charging element operable to generate an output voltage. The charging element is configured during a cycle, including to charge the charging element for an on-time, discharge the charging element for a discharge time, and tristate the charging element for a tristate time. Prior to a power mode changing which increases the current demand of the load, the on-time is increased.

20 Claims, 15 Drawing Sheets

(56) References Cited

U.S. PATENT DOCUMENTS

| | | | |
|---|---|---|---|
| 6,055,287 A | 4/2000 | McEwan | |
| 6,125,157 A | 9/2000 | Donnelly et al. | |
| 6,157,247 A | 12/2000 | Abdesselem et al. | |
| 6,188,206 B1 | 2/2001 | Nguyen et al. | |
| 6,259,293 B1 | 7/2001 | Hayase et al. | |
| 6,259,327 B1 | 7/2001 | Balistreri et al. | |
| 6,285,263 B1 | 9/2001 | Anderson | |
| 6,288,524 B1 | 9/2001 | Tsujimoto | |
| 6,333,652 B1 | 12/2001 | Iida et al. | |
| 6,356,062 B1 | 3/2002 | Elmhurst et al. | |
| 6,396,251 B2 | 5/2002 | Corva et al. | |
| 6,424,184 B1 | 7/2002 | Yamamoto et al. | |
| 6,425,086 B1 | 7/2002 | Clark et al. | |
| 6,449,110 B1 | 9/2002 | DeGroat et al. | |
| 6,449,575 B2 | 9/2002 | Bausch et al. | |
| 6,515,460 B1 | 2/2003 | Farrenkopf | |
| 6,525,585 B1 | 2/2003 | Iida et al. | |
| 6,535,735 B2 | 3/2003 | Underbrink et al. | |
| 6,577,535 B2 | 6/2003 | Pasternak | |
| 6,617,936 B2 | 9/2003 | Dally et al. | |
| 6,622,252 B1 | 9/2003 | Klaassen et al. | |
| 6,657,467 B2 | 12/2003 | Seki et al. | |
| 6,693,473 B2 | 2/2004 | Alexander et al. | |
| 6,721,255 B1 | 4/2004 | Gushima et al. | |
| 6,774,694 B1 | 8/2004 | Stern et al. | |
| 6,831,494 B1 | 12/2004 | Fu et al. | |
| 6,868,503 B1 | 3/2005 | Maksimovic et al. | |
| 6,870,410 B1 | 3/2005 | Doyle et al. | |
| 6,885,210 B1 | 4/2005 | Suzuki | |
| 6,909,266 B2 | 6/2005 | Kernahan et al. | |
| 6,970,045 B1 | 11/2005 | Lichter et al. | |
| 6,987,380 B1 | 1/2006 | Lee | |
| 7,015,735 B2 | 3/2006 | Kimura et al. | |
| 7,042,202 B2 | 5/2006 | Sutardja et al. | |
| 7,061,292 B2 | 6/2006 | Maksimovic et al. | |
| 7,102,446 B1 | 9/2006 | Lee et al. | |
| 7,109,695 B2 | 9/2006 | King | |
| 7,129,763 B1 | 10/2006 | Bennett et al. | |
| 7,151,417 B1 | 12/2006 | Suzuki | |
| 7,176,663 B2 | 2/2007 | Takimoto et al. | |
| 7,205,805 B1 | 4/2007 | Bennett | |
| 7,259,603 B2 | 8/2007 | Gibson et al. | |
| 7,276,925 B2 | 10/2007 | Dobberpuhl et al. | |
| 7,330,017 B2 | 2/2008 | Dwarakanath et al. | |
| 7,330,019 B1 * | 2/2008 | Bennett | 323/282 |
| 7,421,604 B1 | 9/2008 | Mimberg | |
| 7,437,580 B2 | 10/2008 | Henderson et al. | |
| 7,441,137 B1 | 10/2008 | Mimberg | |
| 7,454,643 B2 | 11/2008 | He et al. | |
| 7,486,060 B1 * | 2/2009 | Bennett | 323/282 |
| 7,551,383 B1 | 6/2009 | Kupferman | |
| 7,592,791 B2 * | 9/2009 | Emira | 323/283 |
| 7,733,189 B1 | 6/2010 | Bennett | |
| 8,085,020 B1 * | 12/2011 | Bennett | 323/282 |
| 2003/0093160 A1 | 5/2003 | Maksimovic et al. | |
| 2004/0257056 A1 | 12/2004 | Huang et al. | |
| 2005/0099235 A1 | 5/2005 | Sakamoto et al. | |
| 2005/0134391 A1 | 6/2005 | Kimura et al. | |
| 2005/0140418 A1 | 6/2005 | Muniandy et al. | |
| 2005/0218871 A1 | 10/2005 | Kang et al. | |
| 2005/0218877 A1 | 10/2005 | Oswald et al. | |
| 2005/0251700 A1 | 11/2005 | Henderson et al. | |
| 2006/0119339 A1 | 6/2006 | King | |
| 2006/0129852 A1 | 6/2006 | Bonola et al. | |
| 2006/0161678 A1 | 7/2006 | Bopardikar et al. | |
| 2006/0176040 A1 | 8/2006 | Kernahan et al. | |
| 2006/0220753 A1 | 10/2006 | Boerstler et al. | |
| 2006/0227861 A1 | 10/2006 | Maksimovic et al. | |
| 2008/0252280 A1 | 10/2008 | Prodic et al. | |
| 2009/0143032 A1 * | 6/2009 | Ojanen et al. | 455/127.1 |
| 2010/0231299 A1 * | 9/2010 | Wang et al. | 330/253 |

OTHER PUBLICATIONS

T. D. Burd, et al., "A Dynamic Voltage Scaled Microprocessor System," IEEE Journal of Solid-State Circuits, vol. 35, No. 11, pp. 1571-1580, Nov. 2000.

Gu-Yeon Wei, et al., "A Fully Digital, Energy-Efficient, Adaptive Power-Supply Regulator," IEEE Journal of Solid-State Circuits, vol. 34, No. 4, pp. 520-528, Apr. 1999.

Anthony John Stratakos, "High-Efficiency Low-Voltage DC-DC Conversion for Portable Applications," pp. 1, 124-129, 177-183, 188-191, Ph.D. Dissertation, University of California, Berkley, Dec. 1998.

Aleksandar Prodic, et al., "Mixed-Signal Simulation of Digitally Controlled Switching Converters," IEEE Compel, pp. 100-105, Jun. 2002.

Jinwen Xiao, et al., "A 4-μA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

Marc Fleischmann, "LongRun Power Management, Dynamic Power Management for Crusoe Processors," Transmeta Corporation, pp. 1-18, Jan. 17, 2001.

Alexander Klaiber, "The Technology Behind Crusoe Processors, Low-Power x86-Compatible Processors Implemented with Code Morphing Software," Transmeta Corporation, pp. 1-18, Jan. 2000.

"Applications for White LED Driver in Parallel vs. Series," Analog Integrations Corporation (AIC), AIC1845, AN027.pdf, www.analog.com, pp. 1-7, Oct. 2003.

"Power Supply Regulation," printout from Altera website, http://www.altera.com/support/devices/power/regulators/pow-regulators.html, Oct. 2006.

Lu Yun, et al., "A Current Steering Logic Based Ring Oscillator for High Stability and Lower Noise Applications", High Density Packaging and Microsystem Integration, 2007. HDP '07, International Symposium on, Jun. 26-28, 2007, pp. 1-3.

Moore, B., et al., "Design of wireless sub-micron characterization system", VLSI Test Symposium, 2004, Proceedings. 22nd IEEE, Apr. 25-29, 2004, pp. 341-346.

Boit et al., Interaction of Laser Beam with Semiconductor Device (IC), Retrieved Jan. 29, 2009 from http://mikro.ee.tu-berlin.de/h1b/emmi/poster_emmi1.pdf.

Wang et al., "Technology Challenges Motivating Adaptive Techniques", Adaptive Techniques for Dynamic Processor Optimization, Spring US, ISSN 1558-9412, 2008, pp. 1-23.

Wei, Gu-Yeon, "Energy-Efficient I/O Interface Design with Adaptive Power-Supply Regulation", A Dissertation Submitted to the Department of Electrical Engineering and the Committee on Graduate Studies of Stanford University, Jun. 2001, retrieved from http://www-vlsi.stanford.edu/papers/gyw_thesis.pdf on Jan. 29, 2009.

* cited by examiner

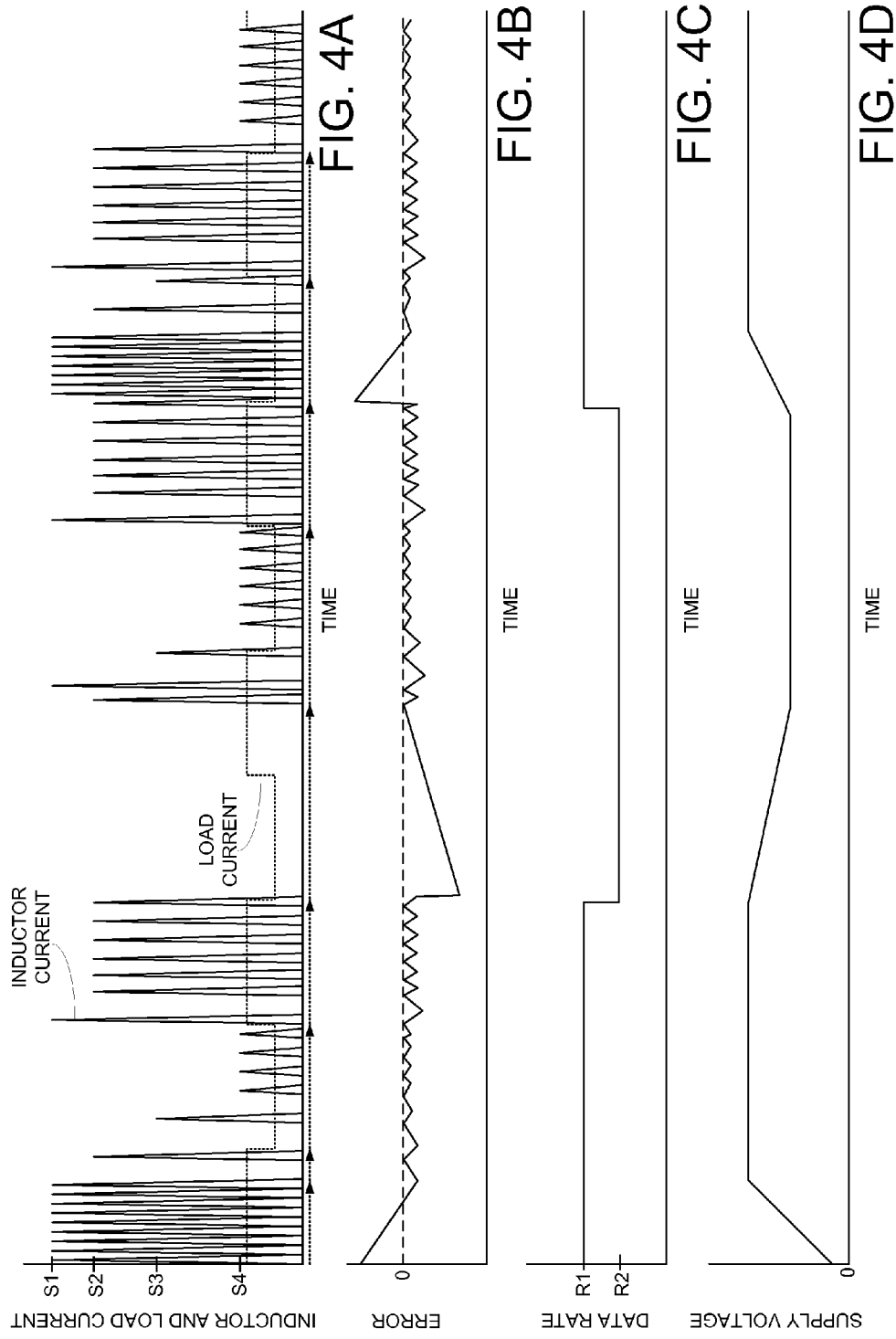

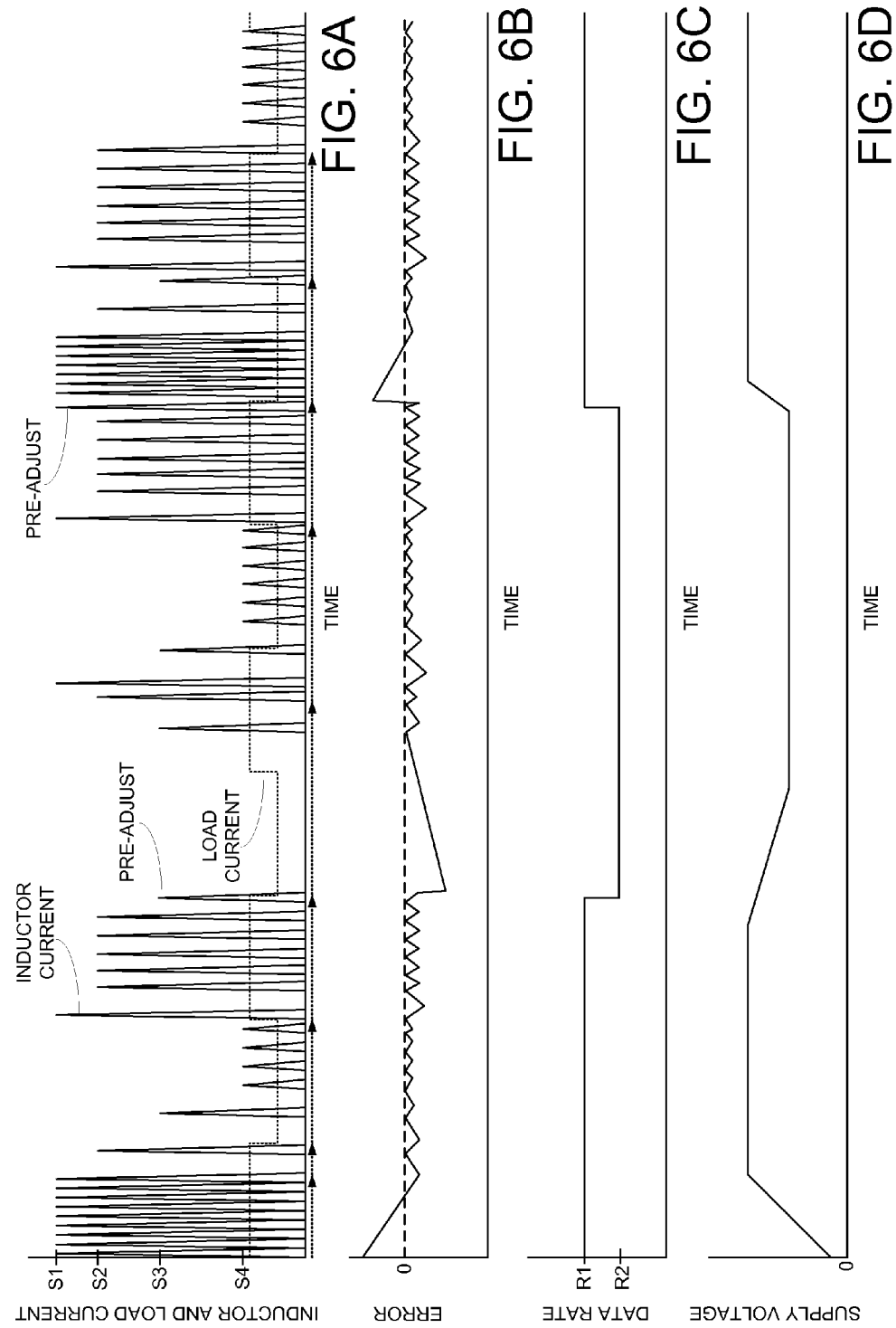

US 8,912,778 B1

SWITCHING VOLTAGE REGULATOR EMPLOYING CURRENT PRE-ADJUST BASED ON POWER MODE

CROSS REFERENCE TO RELATED PATENTS AND PATENT APPLICATIONS

This application is related to U.S. patent application Ser. No. 11/393,425 filed on Mar. 30, 2006 now U.S. Pat. No. 7,486,060, entitled "SWITCHING VOLTAGE REGULATOR COMPRISING A CYCLE COMPARATOR FOR DYNAMIC VOLTAGE SCALING" the disclosure of which is incorporated herein by reference.

BACKGROUND

Discontinuous switching voltage regulators comprise a charging element that is charged/discharged and then tristated over a cycle that begins when an error signal exceeds a threshold. For example, the charging time may begin when an output voltage falls below a reference voltage, or when a propagation oscillation signal representing a propagation delay of a digital circuit falls below a reference oscillation signal. In a discontinuous buck mode switching voltage regulator, the charging element typically comprises an inductor that is connected to a source voltage through an upper switch (e.g., a field effect transistor or FET) while charging during an "on-time," and connected to ground through a lower switch (e.g., using a diode or FET) while discharging during a "discharge time." Once the inductor discharges, both the upper and lower switches are opened to tristate the inductor during a "tristate time" in order to prevent the inductor from resonating with the output capacitor. The inductor remains in tristate until the error signal exceeds the threshold which starts a new cycle.

BRIEF DESCRIPTION OF THE DRAWINGS

FIGS. 4A-4D illustrate operation of a discontinuous switching voltage regulator according to an embodiment of the present invention, including the inductor current, the load current, the error signal, the data rate of the system circuitry, and the output voltage.

FIGS. 6A-6D illustrate an embodiment of the present invention including the effect of pre-adjusting the voltage regulator by changing the state prior to the power mode changing.

DETAILED DESCRIPTION OF EMBODIMENTS OF THE INVENTION

Figure 1A:
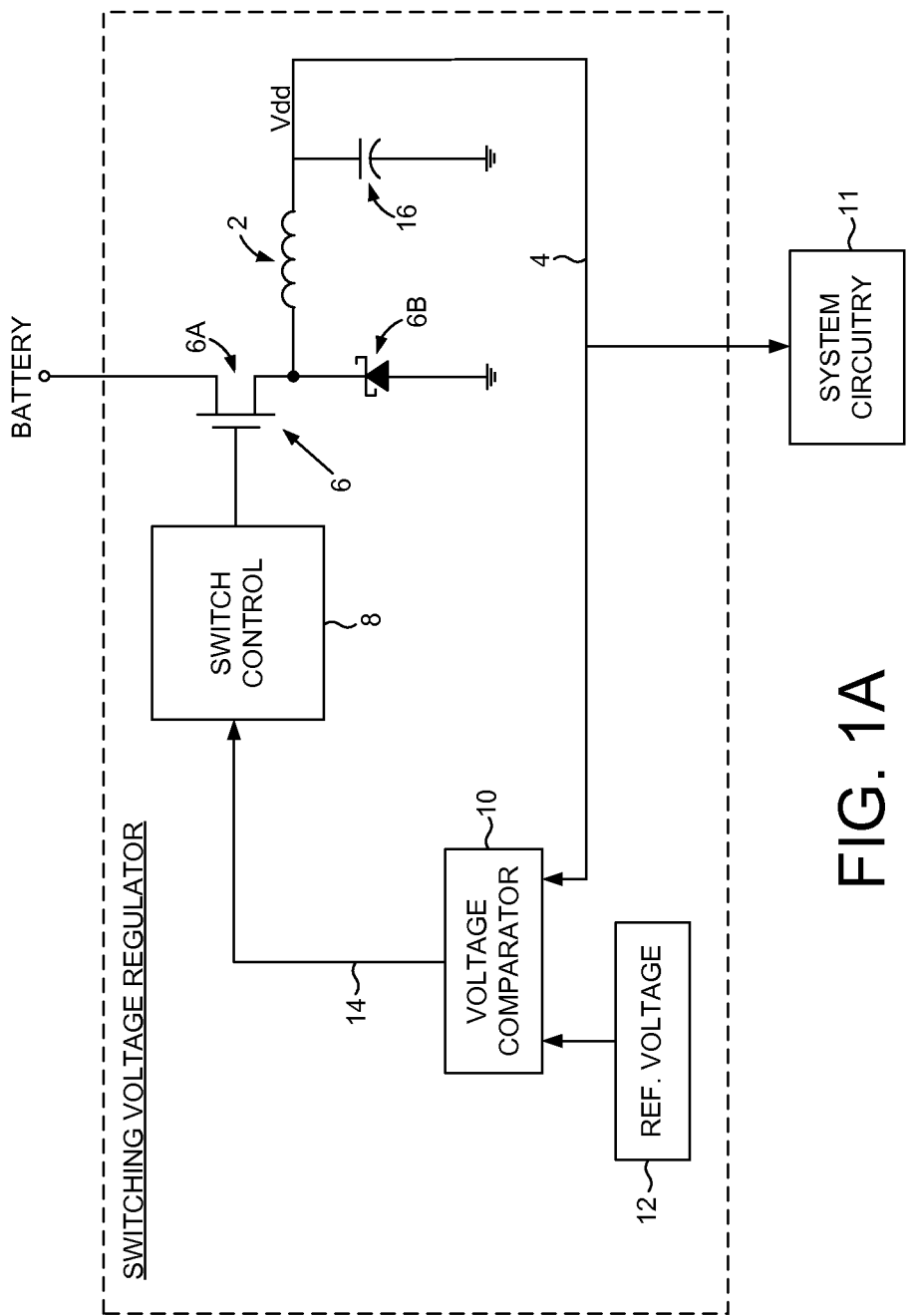
FIG. 1A shows a discontinuous switching voltage regulator according to an embodiment of the present invention comprising an inductor, switching circuitry, and switch control circuitry for controlling the switching circuitry in response to an error signal representing a difference between the output voltage and a reference voltage.

FIG. 1A shows an embodiment of the present invention comprising a switching voltage regulator including a charging element 2 operable to generate an output voltage 4, switching circuitry 6 coupled to the charging element 2, and switch control circuitry 8 operable to control the switching circuitry 6 to configure the charging element 2 during a cycle, including to charge the charging element 2 for an on-time, discharge the charging element 2 for a discharge time, and tristate the charging element 2 for a tristate time. In operation, the on-time is initialized to a first on-time, and a first switch time is measured comprising the first on-time and a first discharge time of a first cycle. A first tristate time of the first cycle is also measured, and a first ratio of the first tristate time to the first switch time is determined. The first ratio is compared to a first ratio threshold, and the on-time is decreased to a second on-time if the first ratio exceeds the first ratio threshold. Prior to a power mode changing which increases the current demand of the load, the on-time is increased to the first on-time.

In the embodiment of FIG. 1A, the charging element 2 comprises an inductor, which may be implemented as a discrete or integrated element; however, any suitable charging element may be employed. The output voltage 4 is applied to system circuitry 11 and to a voltage comparator 10, which compares the output voltage 4 to a reference voltage 12. The reference voltage 12 is selected relative to the target output voltage 4, and it may be adjusted relative to the system circuitry's 11 mode of operation. For example, the reference voltage 12 may be reduced during modes of operation that require less power (e.g., slower data rate in a communication channel).

Figure 2A:
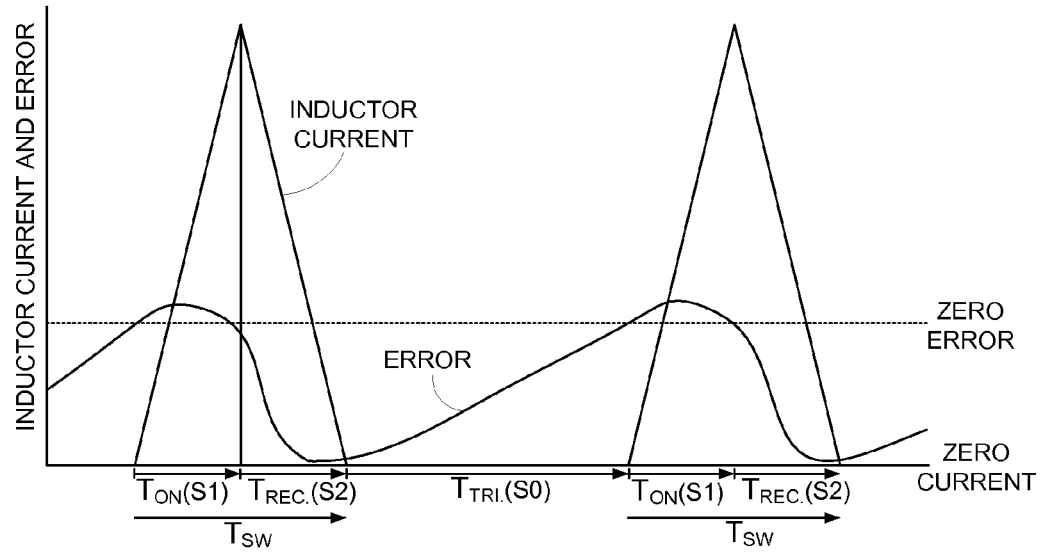
FIG. 2A illustrates an inductor current relative to an error signal as well as an on-time, discharge time, and tristate time of a cycle, according to one embodiment of the present invention.

As illustrated in FIG. 2A, when the output voltage 4 falls below the reference voltage 12, the resulting error signal 14 triggers the switch control circuitry 8 to begin a cycle by turning on a FET 6A to charge the charging element 2 for the on-time, thereby building a charge across a capacitor 16. After the on-time, the switch control circuitry 8 turns off the FET 6A so that the inductor current discharges while recirculating through a diode 6B to ground. When the inductor current falls to zero (or near zero) at the end of the recirculation time (i.e., discharge time), the diode 6B stops conducting, thereby preventing the output capacitor 16 from discharging through the inductor 2 to ground. The inductor 2 remains in this tristate condition during the tristate time until the output voltage 4 falls below the reference voltage 12 (and the error signal turns positive), as shown in FIG. 2A. In an alternative embodiment, the diode 6B is replaced with a FET and a current sensor, wherein the FET is turned off when the current sensor detects zero current flowing through the FET at the end of the discharge time.

Figure 1B:
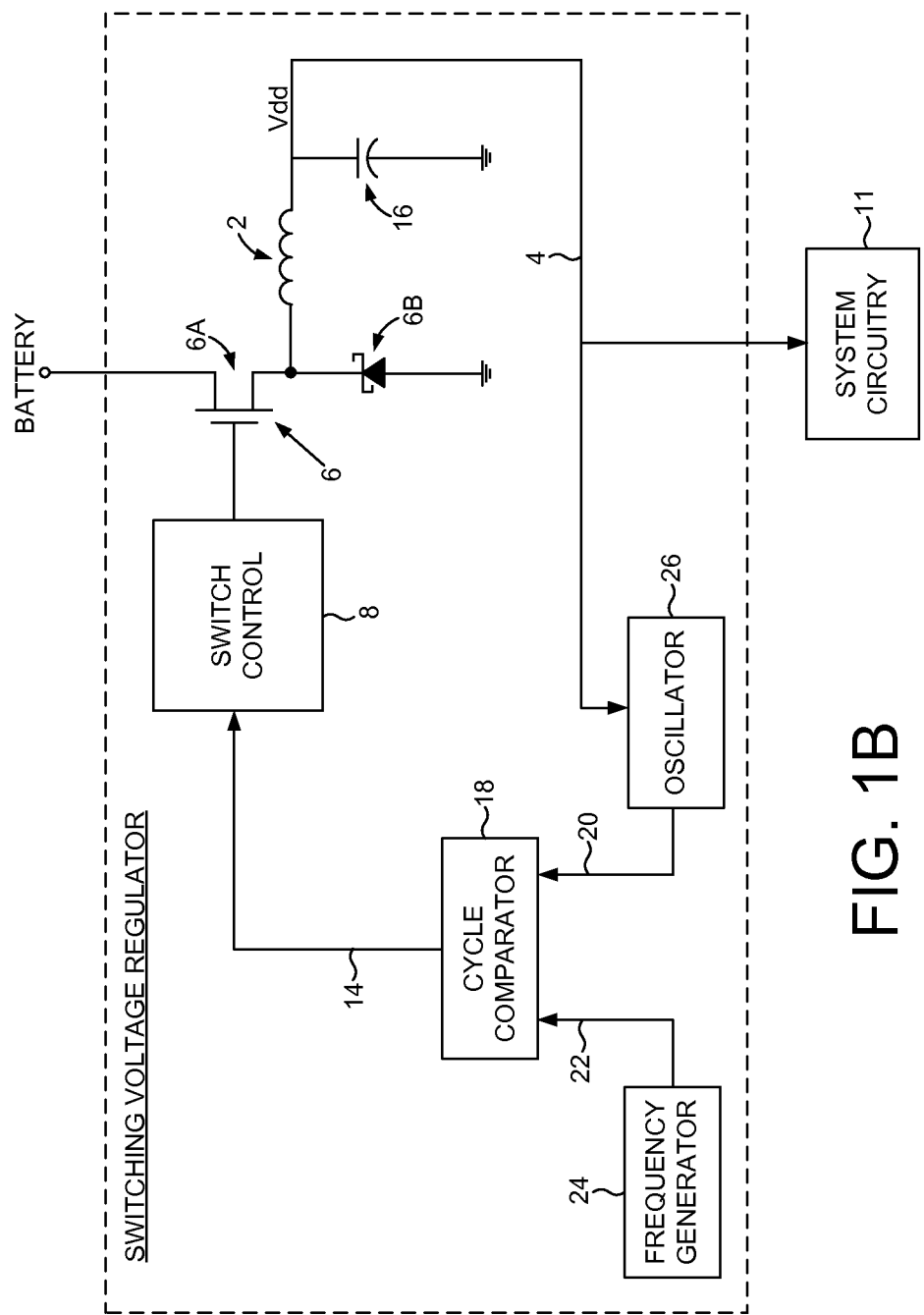
FIG. 1B shows a discontinuous switching voltage regulator according to an embodiment of the present invention comprising an inductor, switching circuitry, and switch control circuitry for controlling the switching circuitry in response to an error signal representing a difference between a propagation oscillation signal and a reference oscillation signal.

The error signal 14 may be generated in any suitable manner. FIG. 1B shows an embodiment of the present invention wherein the error signal 14 is generated by a cycle comparator 18 which compares a propagation oscillation signal 20 to a reference oscillation signal 22 output by a frequency generator 24. An oscillator 26 generates the propagation oscillation signal 20 which represents a propagation delay of a digital circuit within the system circuitry 11. Further details of this embodiment may be found in the above-identified co-pending patent application entitled "SWITCHING VOLTAGE REGULATOR COMPRISING A CYCLE COMPARATOR FOR DYNAMIC VOLTAGE SCALING." In yet other embodiments, the error signal 14 may represent a phase or frequency error between the propagation oscillation signal 20 and the reference oscillation signal 22 output by the frequency generator 24.

Figure 2B:
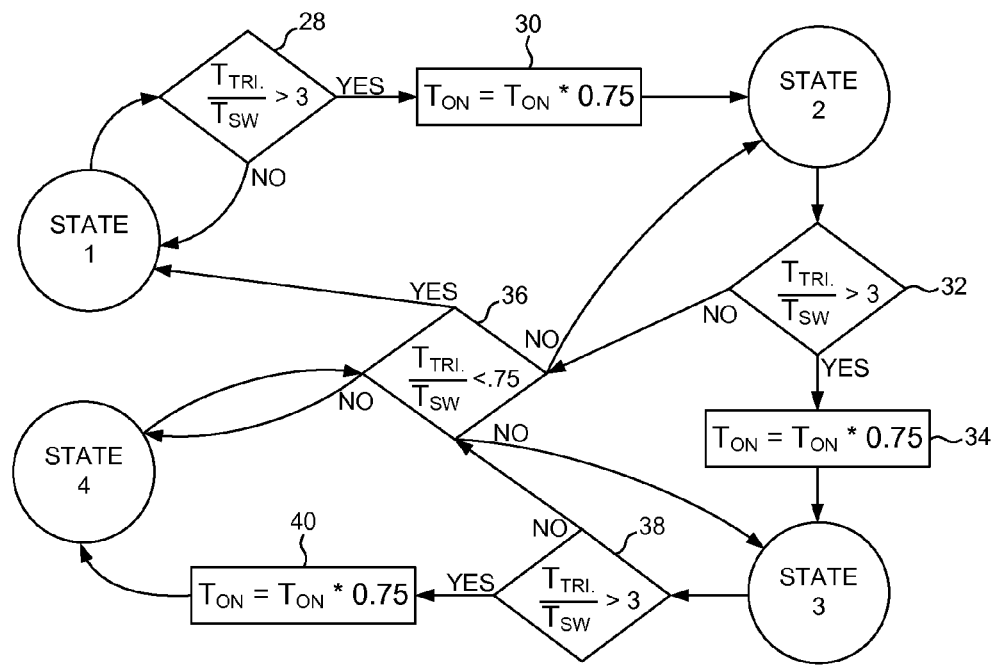
FIG. 2B is a state diagram illustrating an embodiment of the present invention wherein the on-time is reduced if the ratio of the tristate time to the switch time exceeds a predetermined threshold.

FIG. 2B is a state diagram illustrating how the on-time is adjusted according to an embodiment of the present invention. Operation of the discontinuous switching voltage regulator begins in STATE 1 where the on-time is initialized to a first on-time. In one embodiment, the first on-time is selected to maximize the peak inductor current while preventing damage to the FET 6A (e.g., an on-time that corresponds to the maximum peak current the FET 6A can handle minus a predetermined margin). During a first cycle, a first switch time ($T_{SW}$) is measured comprising the first on-time ($T_{ON}$) and a first discharge time ($T_{REC}$) of the inductor 2. A first tristate time of the first cycle is also measured, and a first ratio ($T_{TRI}/T_{SW}$) of the first tristate time to the first switch time is determined at branch 28. If the first ratio is greater than a first ratio threshold (e.g., 3) at branch 28, then at step 30 the on-time ($T_{ON}$) is adjusted to a second on-time by reducing the on-time by 25%, and the state changes to STATE 2. Otherwise, the on-time ($T_{ON}$) is not adjusted and the state remains in STATE 1. Any suitable value may be selected for the ratio threshold. For example, the first ratio threshold may be selected relative to the number of states in the state diagram, and/or relative to the range of on-times.

Referring again to FIG. 2B, assuming the state changes to STATE 2, during a second cycle a second switch time ($T_{SW}$) is measured comprising the second on-time ($T_{ON}$) and a second discharge time ($T_{REC}$) of the inductor 2. A second tristate time ($T_{TRI}$) of the second cycle is also measured, and a second ratio ($T_{TRI}/T_{SW}$) of the second tristate time to the second switch time is determined at branch 32. If the second ratio is greater than a second ratio threshold (e.g., 3) at branch 32, then at step 34 the on-time ($T_{ON}$) is adjusted to a third on-time by reducing the on-time by 25%, and the state changes to STATE 3. Thus, in one embodiment, the second on-time is approximately 1/N times the first on-time, the third on-time is approximately 1/N times the second on-time, and so on for the on-time of the following states. If the second ratio is not greater than the second ratio threshold at branch 32, then the second ratio is compared to a third ratio threshold (e.g., 0.75) at branch 36. If the second ratio is less than the third ratio threshold at branch 36, then the on-time is reset to the first on-time, and the state changes to STATE 1. Otherwise, the on-time ($T_{ON}$) is not adjusted, and the state remains in STATE 2. Assuming the state changes to STATE 3, a third switch time and a third tristate time are measured during a third cycle, a similar ratio generated and compared to a third ratio threshold at step 38, and the on-time adjusted accordingly at step 40.

The state diagram of FIG. 2B may comprise any suitable number of states, and may also be modified in any suitable manner. Adjusting the on-time relative to the ratio of the tristate time to the switch time may improve the transient response without requiring an analog current sensor or a programmable analog current comparator as in the prior art.

Figure 3A:
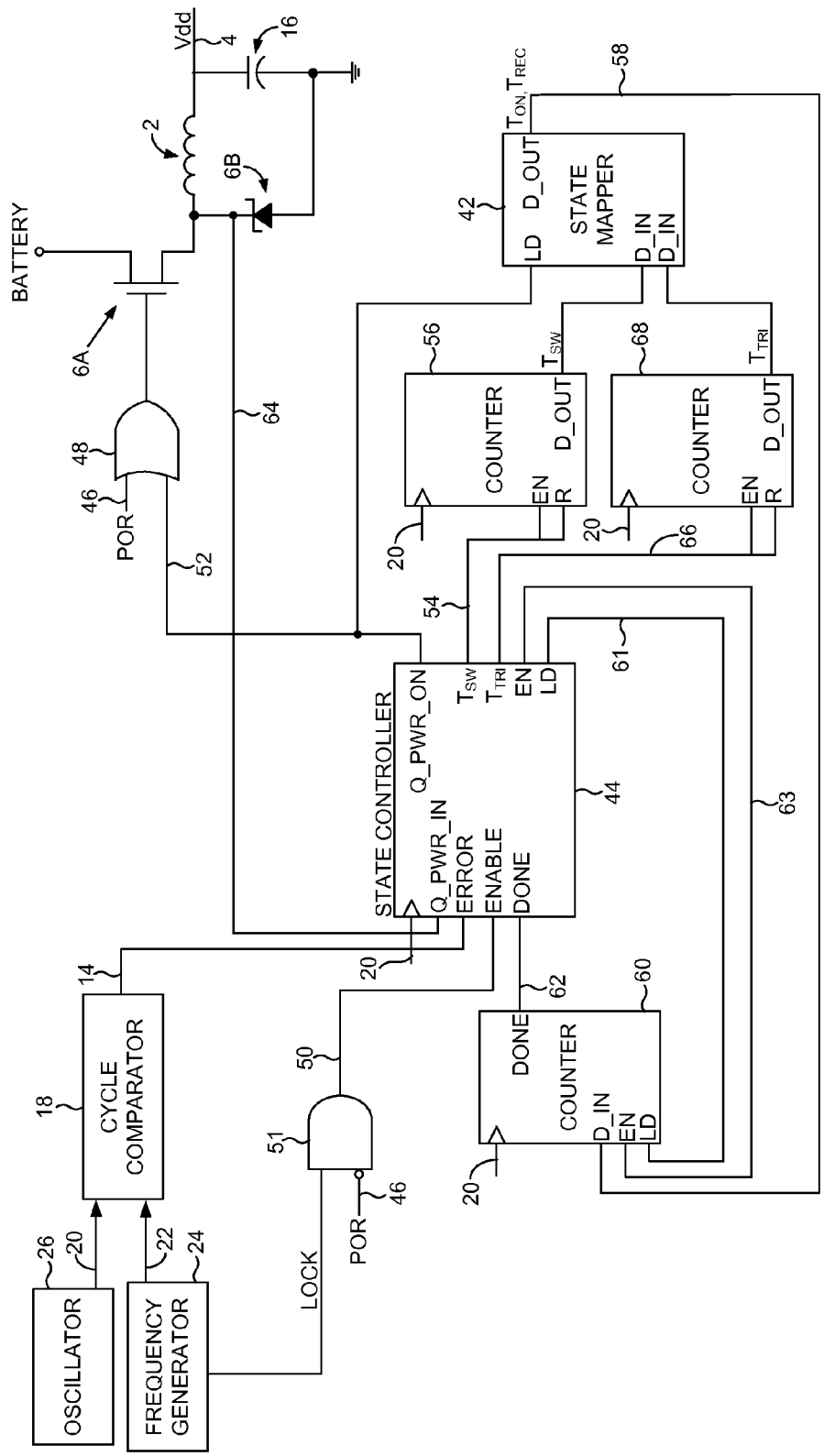
FIG. 3A shows example circuitry for implementing a discontinuous switching voltage regulator according to an embodiment of the present invention, including a state mapper for implementing the state diagram of FIG. 2B and state controller circuitry.

FIG. 3A shows circuitry for implementing a discontinuous switching voltage regulator according to an embodiment of the present invention, wherein the error signal 14 is generated by comparing a propagation oscillation signal 20 to a reference oscillation signal 22. However, the circuitry disclosed in FIG. 3A may also be employed in an embodiment wherein the error signal 14 is generated using a different method, for example, by comparing the output voltage 4 to a reference voltage 12 as shown in FIG. 1A. The circuitry in FIG. 3A comprises state mapper circuitry 42 for implementing the state diagram of FIG. 2B, and state controller circuitry 44 for generating three state signals S0, S1 and S2 corresponding to three states of the switching voltage regulator $T_{TRI}$, $T_{ON}$, and $T_{REC}$. The state mapper circuitry 42 may comprise any suitable circuitry for implementing the state diagram of FIG. 2B, such as a suitable state machine together with suitable math operators (multipliers, dividers, etc.) and/or code segments of a control program executed by a microprocessor.

At startup, a power-on-reset (POR) signal 46 is held high turning FET 6A on through OR gate 48 until the output voltage 4 rises sufficiently for the oscillator 26 to function properly. When POR 46 is reset, the FET 6A is turned off. When the frequency generator 24 is frequency locked, the state controller 44 is enabled via control signal 50 output by AND gate 51. At this point, the state controller 44 has been initialized to state S0 (tristate time of FIG. 2A).

When the error signal 14 is high (e.g., when the propagation oscillation signal 20 falls below the reference oscillation signal 22), the state controller 44 transitions from state S0 to state S1 (on-time of FIG. 2A), which turns on FET 6A via control signal 52 and enables via control signal 54 a digital timer (counter) 56 to begin timing the switch time ($T_{SW}$). The state controller 44 also loads the on-time 58 generated by the state mapper 42 into a counter 60 (via control line 61) and enables the counter 60 via control line 63. The counter 60 generates a DONE signal 62 at the end of the on-time. When the DONE signal 62 is activated, the state controller 44 transitions from state S1 to state S2, loads a maximum discharge time into counter 60, and begins monitoring the voltage 64 across the diode 6B to detect the end of the discharge time. In one embodiment, the maximum discharge time is related to the inductor drive voltage (input voltage of the battery minus the output voltage Vdd in FIG. 1), and the flyback voltage that discharges the inductor 2 (Vdd plus the voltage across the diode 6B). If the input voltage is much higher than the output voltage (plus the reverse bias voltage caused by the flyback diode), then the maximum off time is selected to be longer than the on-time.

When the counter 60 reaches a terminal count, or the voltage 64 across the diode 6B indicates the end of the discharge time, the state controller 44 transitions from state S2 to state S0 and enables via control signal 66 a digital timer (counter) 68 for timing the next tristate time ($T_{TRI}$), and stops the counter 56. At the end of the tristate time (e.g., as discussed above, when the error signal 14 goes high), the state controller 44 loads via control signal 52 the switch time ($T_{SW}$) and the tristate time ($T_{TRI}$) into the state mapper 42, which generates the next on-time according to the state diagram of FIG. 2B. In one embodiment, the state mapper 42 generates the next on-time in a manner that compensates for the delay in computing the next on-time.

Figure 3B:
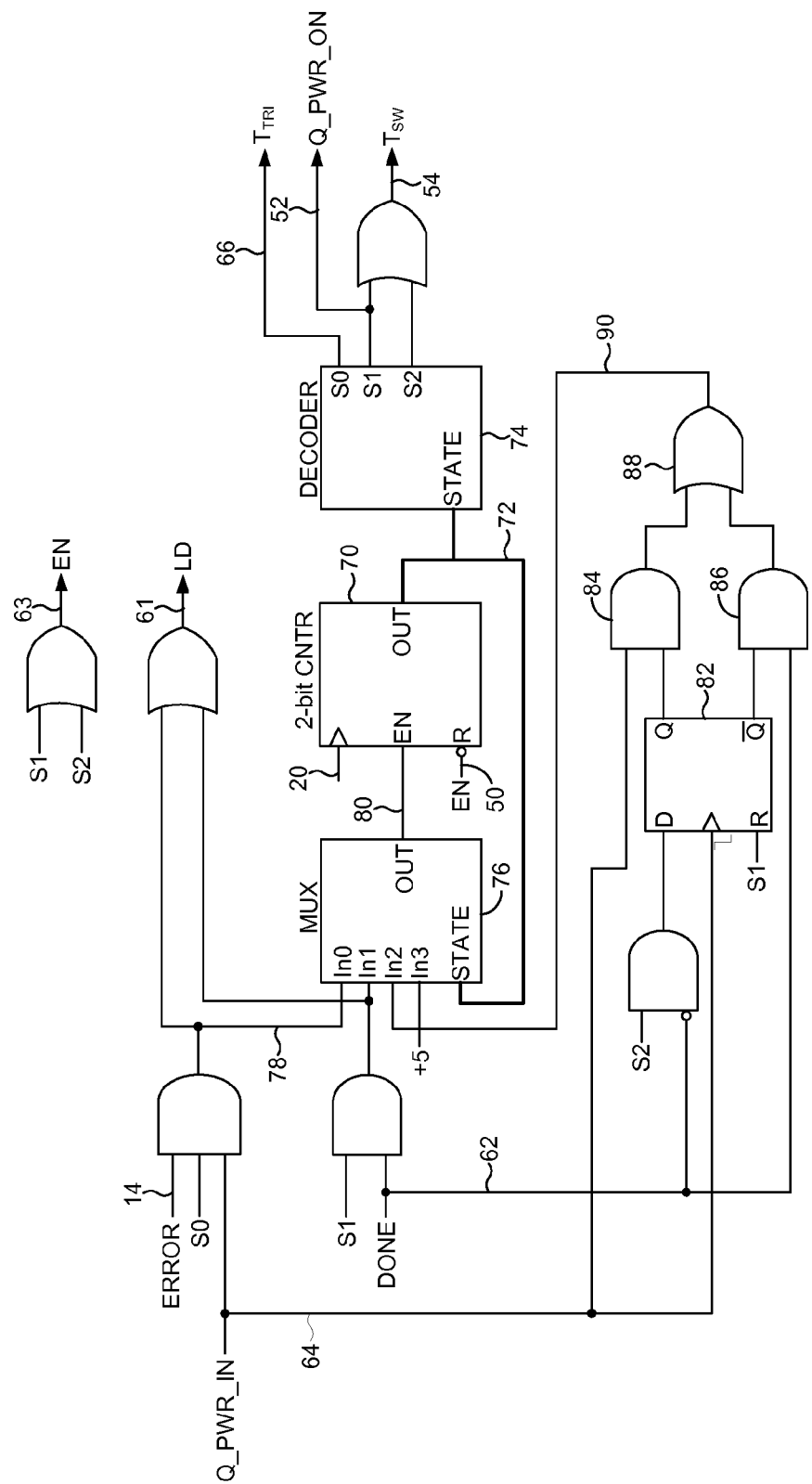
FIG. 3B shows example circuitry according to an embodiment of the present invention for implementing the state controller circuitry of FIG. 3A.

FIG. 3B shows circuitry for implementing the state controller 44 of FIG. 3A according to an embodiment of the present invention. A 2-bit counter 70 generates a 2-bit output 72 representing the three states (S0=00, S1=01, S2=10), and a decoder 74 activates one of three control signals in response to the output 72 of the 2-bit counter 70. The 2-bit counter 70 is initialized to state S0 by the enable signal 50 (see FIG. 3A). The 2-bit counter 70 is enabled by a multiplexer 76 when the switching voltage regulator transitions into the next state. For example, when in state S0, the multiplexer 76 outputs control signal 78 as the enable signal 80 to the 2-bit counter 70. When the error signal 14 is activated, control signal 78 enables the 2-bit counter 70 which transitions from state S0 to state S1. When the DONE signal 62 is activated indicating the end of the on-time, the multiplexer 76 enables the 2-bit counter 70 which transitions from state S1 to state S2. At the beginning of the discharge time (state S2), the voltage across the diode 6B transitions from a high to low logic level (over a certain interval) and then eventually rises from a low to high logic level at the end of the discharge time. A latch 82 is used to detect the low to high transition of voltage 64 at the end of the discharge time. When the voltage 64 transitions from high to low at the end of the on-time, the latch 82 enables an AND gate 84 which then detects the transition from low to high at the end of the discharge time. Alternatively, an AND gate 86 detects if the counter 60 (FIG. 3A) times out before the voltage 64 transitions from low to high. An OR gate 88 outputs the control signal 90 indicating the end of the discharge time, which enables the 2-bit counter 70 to transition from state S2 back to state S0 which activates control signal 66 to begin timing the tristate time.

FIGS. 4A-4D illustrate operation of the switching voltage regulator, including the inductor current, load current, error signal, data rate, and output voltage. When initially powered on, the error signal is high and the state mapper 42 remains in STATE 1 (FIG. 2B) until the output voltage rises to an operating level. Once the output voltage stabilizes, the state mapper 42 reduces the on-time and transitions into STATE 2 and then into STATE 3. When the load current decreases (e.g., due to a change in operating mode), the state mapper 42 further reduces the on-time and transitions into STATE 4. When the load current again increases, the state mapper 42 resets the on-time to the maximum and transitions into STATE 1 as shown in FIG. 4A, and then transitions back into STATE 2 once the system stabilizes. When the data rate decreases as shown in FIG. 4C, the error signal remains negative for an extended period wherein the FET 6A remains off. Eventually the output voltage settles at a lower level corresponding to the lower data rate, and the state mapper 42 decreases the on-time until it settles into STATE 4. The state mapper 42 transitions back into STATE 1 when the load current increases or when the data rate increases as shown in FIGS. 4A and 4C. Adjusting the on-time relative to the ratio of the tristate time to the switch time may improve the transient response, such as when the data rate increases as illustrated in FIGS. 4C and 4D.

Figure 5A:
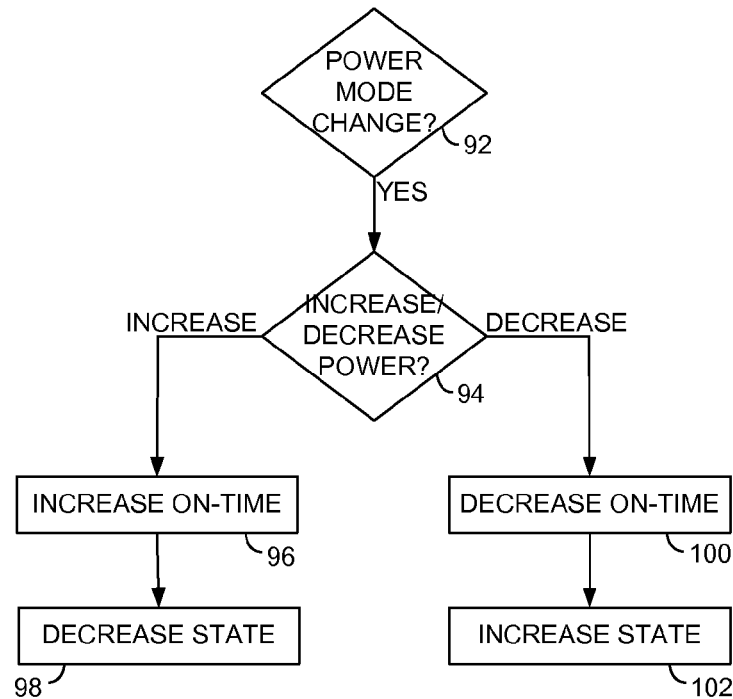
FIG. 5A is a flow diagram according to an embodiment of the present invention wherein prior to the power mode changing, the state of the voltage regulator is changed to pre-compensate for the change in load current associated with the power mode changing.

FIG. 5A is a flow diagram according to an embodiment of the present invention wherein prior to a power mode changing (step 92) which increases the current demand of the load (step 94), the on-time of the charging element is increased (step 96) by decreasing the current state in FIG. 2B. For example, if the current state is STATE 3, the on-time is increased by ⅔ and the state is decreased to STATE 2. In this manner, the charging element (inductor 2) will be charged with more current just prior to the power mode changing which helps compensate for the increase in the current demand of the load.

Figure 5B:
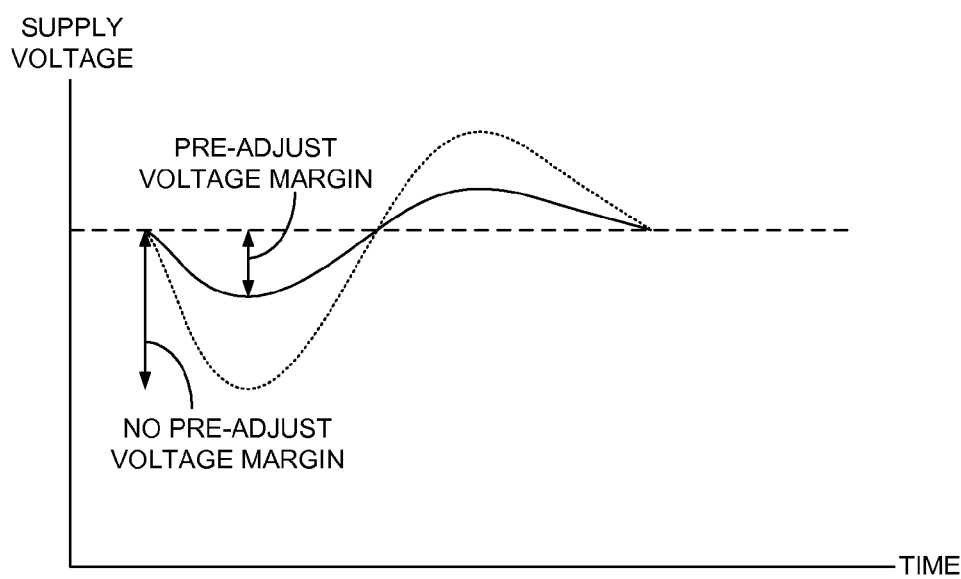
FIG. 5B illustrates an example difference in voltage margin required with and without the pre-adjust embodiment of the present invention when the load current increases.

Pre-adjusting by increasing the on-time reduces the required voltage margin by reducing the supply voltage undershoot as shown in FIG. 5B leading to a more efficient switching voltage regulator. In one embodiment, the voltage undershoot may be further reduced toward zero or even inverted by further increasing the on-time of the charging element. In the above example, the on-time may be increased by more than ⅔ when switching from STATE 3 to STATE 2, or the state may be decreased more than one state, such as by decreasing from STATE 3 to STATE 1 wherein the on-time would increase by ⅔×⅔=16/9.

FIG. 5A also illustrates an embodiment of the present invention wherein prior to a power mode changing (step 92) which decreases the current demand of the load (step 94), the on-time of the charging element is decreased (step 100) by increasing the current state in FIG. 2B. For example, if the current state is STATE 3, the on-time is decreased by ¾ and the state is increased to STATE 4. In this manner, the charging element (inductor 2) will be charged with less current just prior to the power mode changing which helps compensate for the decrease in the current demand of the load. Pre-adjusting by decreasing the on-time reduces the supply voltage overshoot leading to a more efficient switching voltage regulator.

FIGS. 6A-6D illustrate operation of the switching voltage regulator similar to FIGS. 4A-4D described above, with the addition of the pre-adjust compensation for a power mode change. In the embodiment of FIG. 6A, the on-time is pre-adjusted one cycle before the power mode changes (current demand decreases) due to the data rate decreasing, and then it is pre-adjusted one cycle before the power mode changes (current demand increases) due to the data rate increasing as shown in FIG. 6C. As illustrated in FIG. 6B, this reduces the undershoot and overshoot of the error signal as compared to FIG. 4B, and as illustrated in FIG. 6D, it improves the transient response of the supply voltage as compared to FIG. 4D by more closely matching the on time of the switch to the expected load change. This approach also reduces the lag time between a request for higher voltage, and the regulator's compliance with that request (supply voltage latency).

Figure 7:
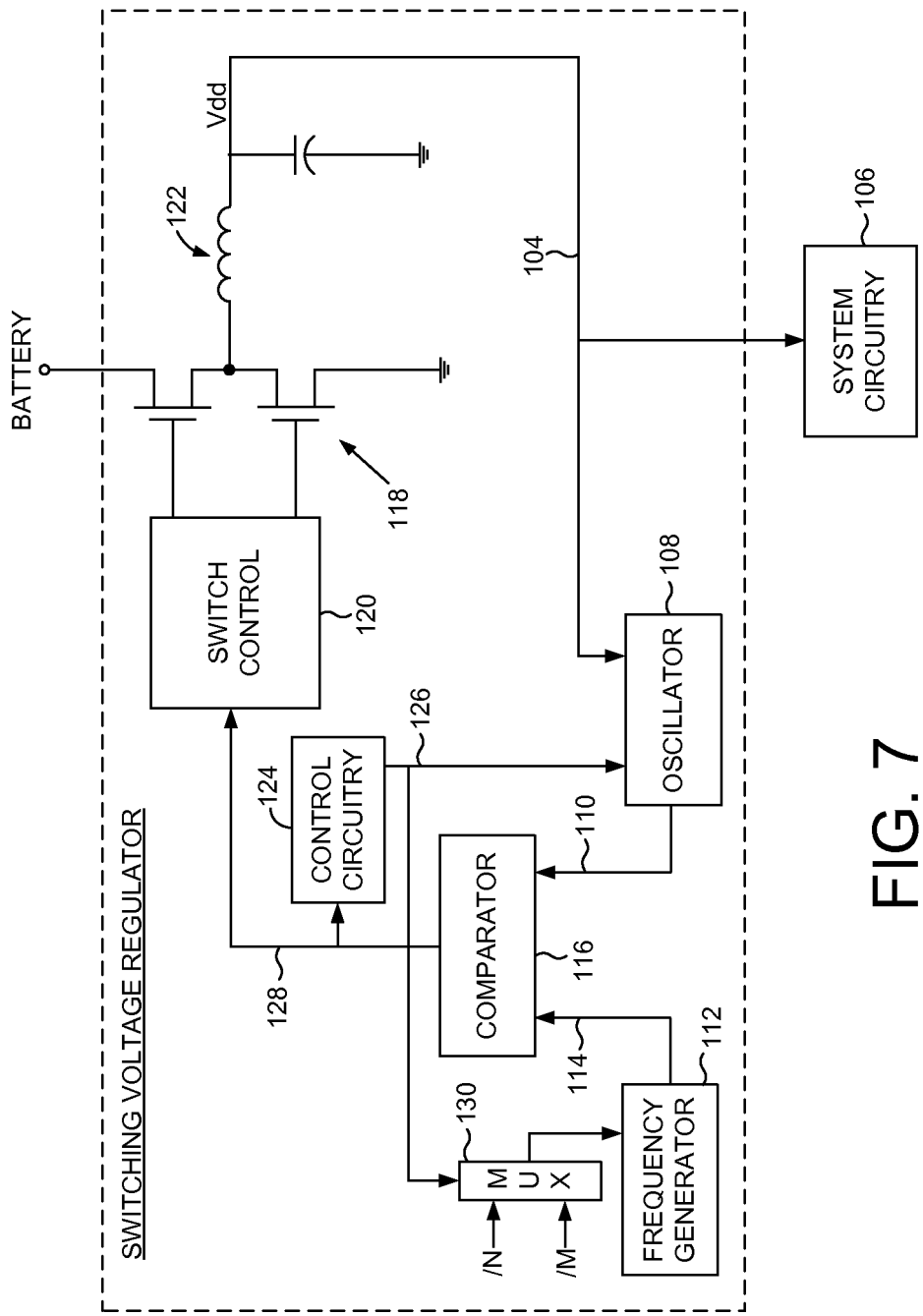
FIG. 7 shows a switching voltage regulator according to an embodiment of the present invention comprising control circuitry for adjusting a frequency of a reference signal and a frequency of a ring oscillator.

FIG. 7 shows a switching voltage regulator operable to regulate a voltage 104 supplied to system circuitry 106. The switching voltage regulator comprises a ring oscillator 108 operable to generate an oscillator signal 110 representing a gate speed of a reference circuit in the system circuitry 106, wherein the ring oscillator 108 comprises a plurality of delay elements connected in series. A frequency generator 112 generates a reference signal 114 representing a target gate speed of the reference circuit, wherein a frequency of the reference signal 114 is based on a divider value. A comparator 116 compares the oscillator signal 110 to the reference signal 114, and switching circuitry 118 (controlled by a switch controller 120) charges a charging element 122 in response to the comparison. Control circuitry 124 adjusts the number of delay elements in the ring oscillator 108 and the divider value of the frequency generator 112 to generate hysteresis in the comparison. Prior to a power mode of the system circuitry changing, a hysteresis threshold is adjusted for controlling a level of the hysteresis.

In one embodiment, the control circuitry 124 of FIG. 7 may comprise a flip-flop having an output 126 that changes state each time the output 128 of the comparator 116 changes state. In one embodiment, the output 128 of the comparator 116 goes high each time a frequency of the oscillator signal 110 falls below a frequency of the reference signal 114. The output 126 of the flip-flop 124 configures a multiplexer 130 to toggle between two divider values (N and M), and adjusts the number of delay elements in the ring oscillator 108. The control circuitry 124 may also comprise suitable delay circuitry to accommodate for the timing characteristics of the switching circuitry 118.

Figure 8:
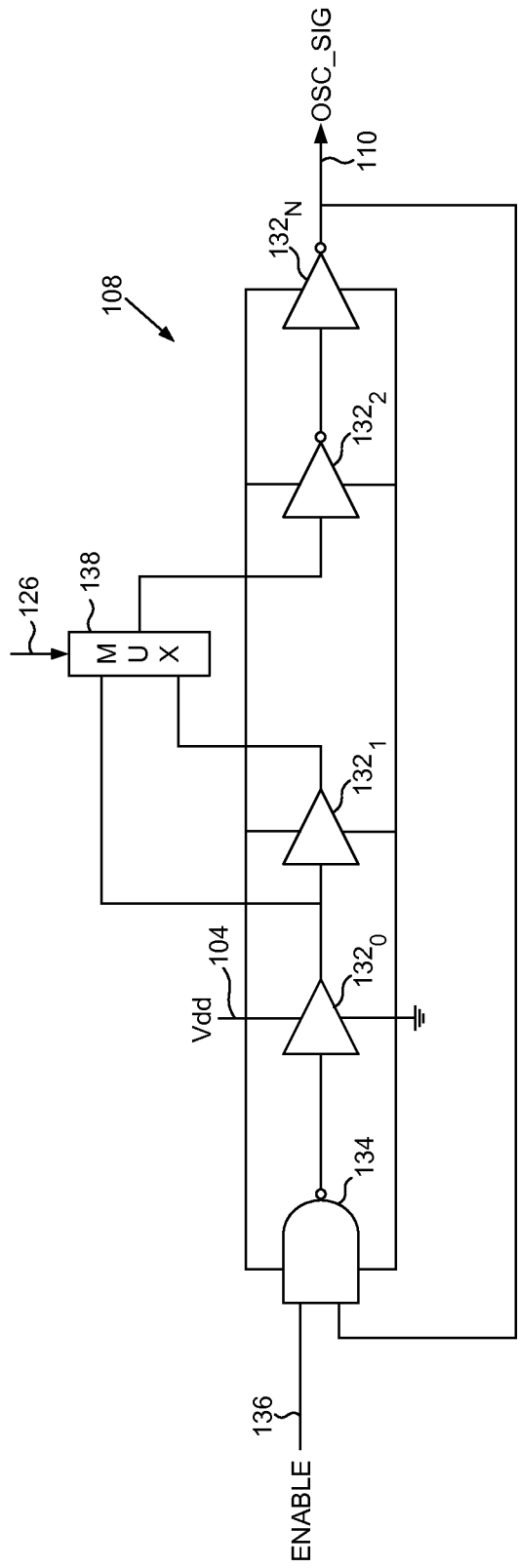
FIG. 8 shows a ring oscillator according to an embodiment of the present invention comprising control circuitry (e.g., a multiplexer) for selecting between a first number of delay elements and a second number of delay elements.

FIG. 8 shows an embodiment of a ring oscillator 108 according to an embodiment of the present invention comprising a plurality of delay elements $132_0$-$132_N$ (including a plurality of inverters) which are powered by the supply voltage 104 generated by the switching voltage regulator. The ring oscillator 108 further comprises a NAND gate 134 having as inputs the output of the last delay element $132_N$ and an enable signal 136. When the enable signal 136 is active, the enable signal 136 will propagate through the delay elements $132_0$-$132_N$ and eventually feedback to the NAND gate 134, thereby generating the oscillator signal 110 having a frequency that is proportional to the supply voltage 104. The frequency of the oscillator signal 110 is adjusted by adjusting the number of delay elements $132_0$-$132_N$ connected in series. In the embodiment of FIG. 8, the flip-flop signal 126 controls a multiplexer 138 to selectively remove/insert delay element $132_1$ in order to make a coarse adjustment to the frequency of the oscillator signal 110.

In one embodiment, the coarse adjustment to the frequency of the reference signal 114 (e.g., by changing the divider value between N and M) is slightly different than the coarse adjustment to the frequency of the oscillator signal 110 (e.g., by changing the number of delay elements) so that the result is a fine adjustment to the threshold in comparator 116 (FIG. 7). Toggling between the two adjusted frequencies thereby introduces a hysteresis in the comparator 116 which increases the efficiency by reducing the peak current relative to the normal load current. In one embodiment, the fractional adjustment to the comparison threshold may be computed as:

$$((d-1)/d)*(n/(n-1))$$

where d is the divider value of the frequency generator 112, and n is the number of delay elements in the ring oscillator 108. For example, if d=17 and n=16, the fractional change to the comparison threshold is:

$$16/17 * 16/15 = 1.004$$

In one embodiment, employing a coarser granularity for (d,n) reduces noise in the supply voltage 104. For example, selecting d=8 and n=7 may reduce noise in the supply voltage 104 as compared to the above example with d=17 and n=16.

Any suitable charging element (e.g., an inductor, a capacitor, etc.) may be employed in the embodiments of the present invention with any suitable switching voltage regulator configuration. In the embodiment of FIG. 7, a buck mode voltage regulator is shown employing an inductor 122 as the charging element. In other embodiments, the switching voltage regulator may include a boost mode voltage regulator, or a buck/boost mode voltage regulator. In addition, the physical location of the elements comprising the switching voltage regulator is unimportant. For example, in certain embodiments, the ring oscillator 108 may be located on a separate chip from the system circuitry 106. In other embodiments, the inductor 122 may be located separately from digital circuitry comprising portions of the switching voltage regulator. Furthermore, the system circuitry 106 may comprise any circuitry supplied by a voltage. In one embodiment, the system circuitry 106 may comprise a microprocessor, as would be typically found in a computer. In another embodiment, the system circuitry 106 may comprise analog circuitry configured to perform one or more tasks.

In one embodiment, the ring oscillator 108 is configurable to represent one of a plurality of different circuits (or circuit paths) within the system circuitry 106 depending on a mode of operation (i.e., the reference circuit may be different circuits at different times). Moreover, the oscillator frequency need not correspond precisely with the gate speed of the reference circuit, but may instead simply track it (e.g., the oscillator frequency may be a multiple of the corresponding gate speed-equivalent frequency of the reference circuit). In a preferred embodiment, the oscillator frequency is directly proportional to the gate speed of the reference circuit. Since the oscillator frequency will vary relative to the magnitude of the supply voltage 104 as well as other factors, such as temperature, adjusting the magnitude of the supply voltage 104 adjusts the frequency of the oscillator signal 110 until the reference circuit is operating at the desired gate speed.

The simulation and layout software used in the design of the system circuitry 106 may provide sophisticated timing analysis of various delays. In one embodiment, the reference circuit within the system circuitry 106 is determined at design time using the simulation and layout software. The gates in the ring oscillator 108 and system circuitry 106 may be fabricated together so they have similar characteristics. Some differences may occur due to loading effects and wire routing; however, by adding inverters, lengthening wires through physical placement, adding dummy loads, and placing the ring oscillator 108 as close as possible to the reference circuit, the ring oscillator 108 may be configured to substantially match the delay of the reference circuit. The ring oscillator 108 will change speed as the temperature changes, as the supply voltage 104 changes, or as the manufacturing process produces faster or slower gates, and thereby track the propagation delay of the reference circuit within the system circuitry 106.

Figure 9:
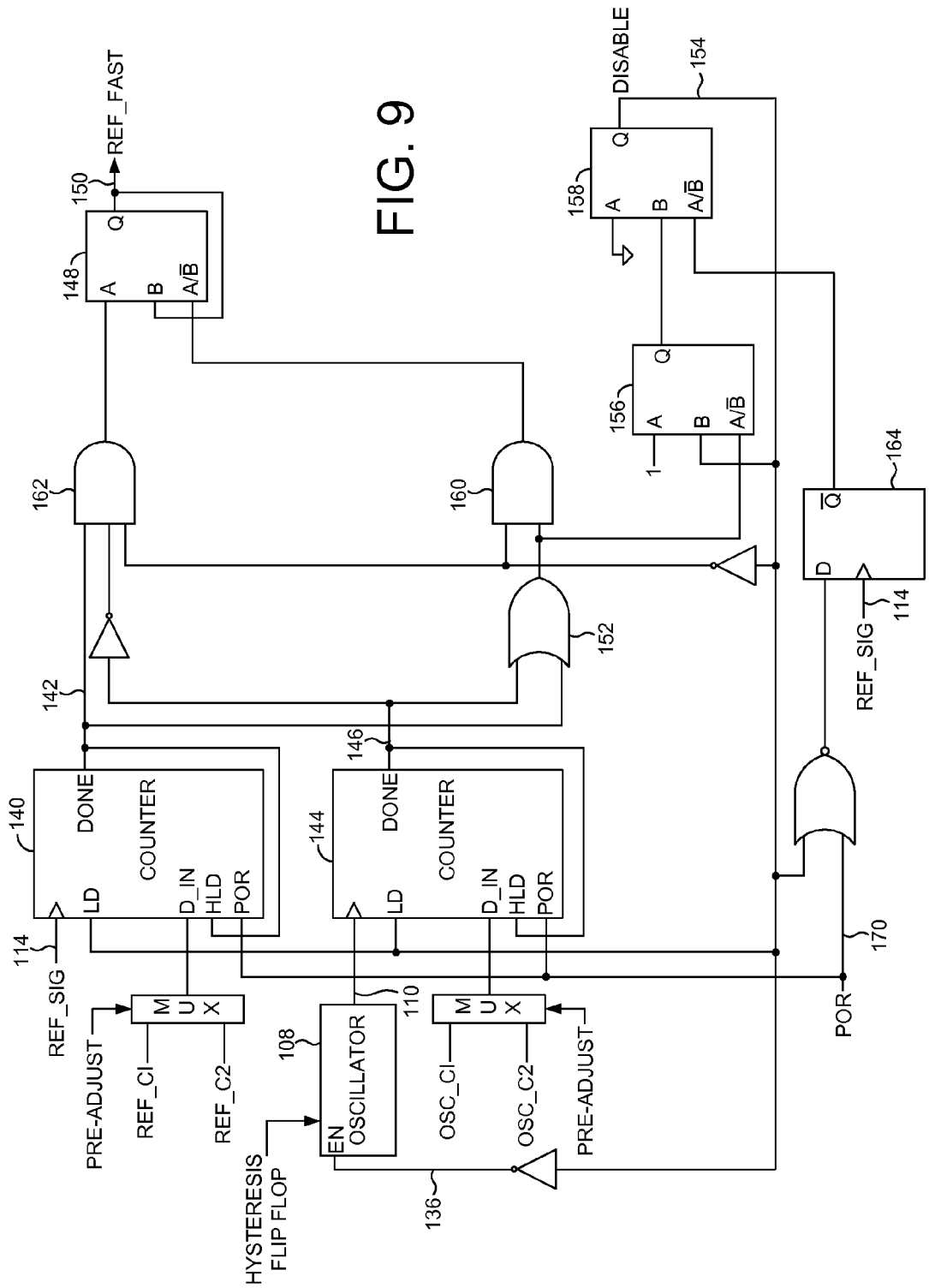
FIG. 9 shows control circuitry according to an embodiment of the present invention for comparing a frequency of the oscillator signal to a frequency of the reference signal.

FIG. 9 shows an example embodiment of the present invention including circuitry for implementing the comparator 116 for comparing at least one cycle of the oscillator signal 110 to at least one cycle of the reference signal 114. The comparator 116 comprises a first register 140 (e.g., a first counter) clocked by the reference signal 114, wherein the first register 140 asserts a first signal 142 at the end of the reference cycle, and a second register 144 (e.g., a second counter) clocked by the oscillator signal 110, wherein the second register 144 asserts a second signal 146 at the end of the oscillator cycle. The comparator 116 further comprises a latch 148 for latching the first signal 142 if generated before the second signal 146. Latch 148 thus outputs a reference fast (REF_FAST) signal 150 indicating when the reference signal 114 is oscillating faster than the oscillator signal 110.

When either the first or second signals 142 or 146 is triggered, an OR gate 152 asserts a disable signal 154 through latches 156 and 158. The disable signal 154 latches the output of latch 148 through AND gate 160, and disables the latch 148 through AND gate 162 until the next sample period. The disable signal 154 also disables the ring oscillator 108 and loads the counters 140 and 144 with appropriate starting values. A register 164 resets the disable signal 154 when clocked by the reference signal 114 to thereby synchronize the ring oscillator 108 and the frequency generator 112.

In one embodiment, the comparator 116 compares one cycle of the oscillator signal 110 to one cycle of the reference signal 114. Because the comparator 116 compares a cycle (or cycles) of the oscillator signal 110 to a cycle (or cycles) of the reference signal 114, as compared to computing a frequency difference using counters, the comparator 116 may in some embodiments reduce the transport delay and quantization error, and thereby improve the transient response of the switching voltage regulator.

The counters 140 and 144 in the embodiment of FIG. 9 enable scaling of the oscillator frequency or the reference frequency. For example, if the frequency of the oscillator signal 110 should equal half the frequency of the reference signal 114, then counter 140 is loaded with a starting value that is twice the starting value loaded into counter 144, from which values the two counters count down at each cycle of the reference and oscillator signals. In another embodiment, the comparator 116 compares multiple cycles of the oscillator signal 110 and reference signal 114 in order to improve the accuracy of the measurement, for example, by compensating for startup transient errors of the ring oscillator 108. For example, in one embodiment, counters 140 and 144 are loaded with a starting value of 2 in order to compare two cycles of the oscillator signal 110 to two cycles of the reference signal 114.

Depending on the speed requirements and circuit tolerances, a number of the components shown in FIG. 9 may be modified or eliminated while still performing the same cycle comparison function. In one embodiment, the counters 140 and 144 are implemented using simple registers for detecting a single cycle of the reference signal 114 and oscillator signal 110, respectively.

Figure 10:
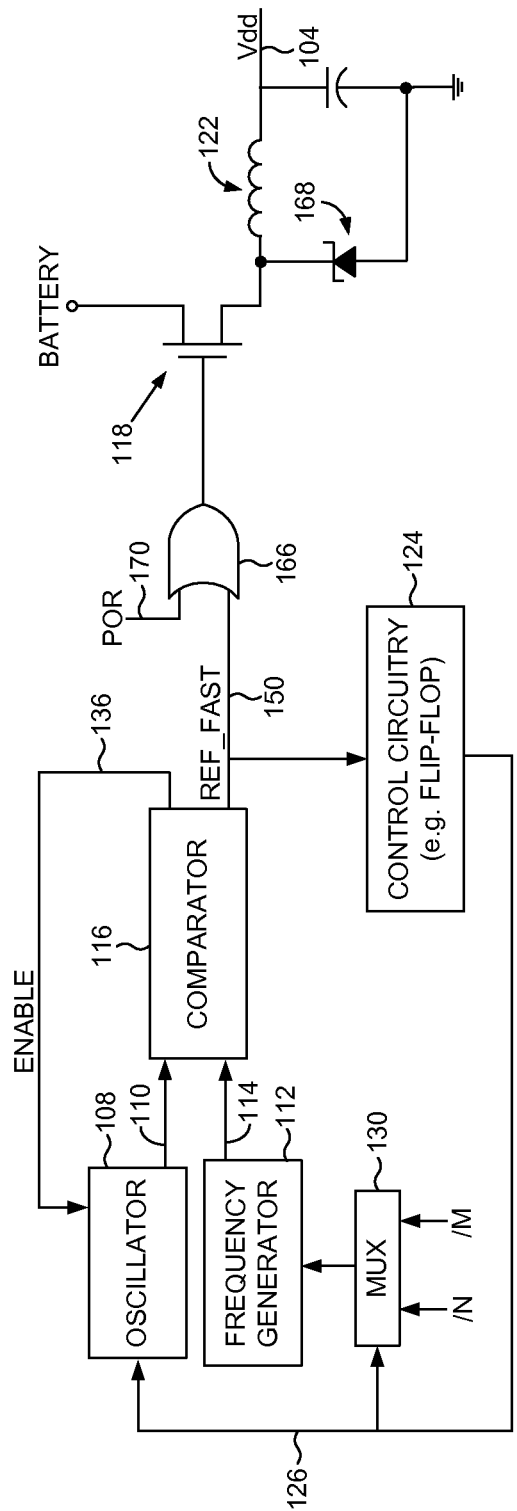
FIG. 10 shows control circuitry according to an embodiment of the present invention wherein the switching circuitry charges the charging element while the reference frequency is above the oscillator frequency.

FIG. 10 shows a switching voltage regulator employing a ring oscillator 108 and comparator 116 according to an embodiment of the present invention. When the REF_FAST signal 150 is active (indicating that the output voltage 104 is too low), it turns on switch 118 through OR gate 166 so as to charge the charging element 122. The REF_FAST signal 150 also toggles flip-flop 124 so as to adjust the divider value of the frequency generator 112 and the number of delay elements in the ring oscillator 108 to effectively raise the threshold in the comparator 116. The switch 118 remains on until the oscillator signal 110 rises above the higher threshold, at which time the REF_FAST signal 150 goes low turning off the switch 118 to stop charging the charging element 122. When the REF_FAST signal 150 goes low, it also toggles flip-flop 124 so as to lower the threshold in the comparator 116, thereby keeping switch 118 off until the oscillator signal 110 falls back below the lower threshold.

The switching voltage regulator of FIG. 10 comprises a diode 168 that enables a recirculation current. In an alternative embodiment, the diode 168 of FIG. 10 is replaced with a conventional switch (e.g., a FET, as shown in FIG. 7) to improve efficiency by avoiding the voltage drop of the diode 168. In one embodiment, a current detector is employed to turn off the switch once the current decays to zero.

In one embodiment, the switching voltage regulator further comprises suitable circuitry to facilitate a startup operation during a power-on restart (POR) event. For example, in the embodiment of FIG. 10, a POR signal 170 enables a charge cycle through OR gate 166 regardless of the discharge level of the current in order to help maintain a sufficient output voltage 104 during the startup operation. Once the switching voltage regulator stabilizes, the POR signal 170 is disabled so that the regulator enters the discontinuous mode.

Figure 11:
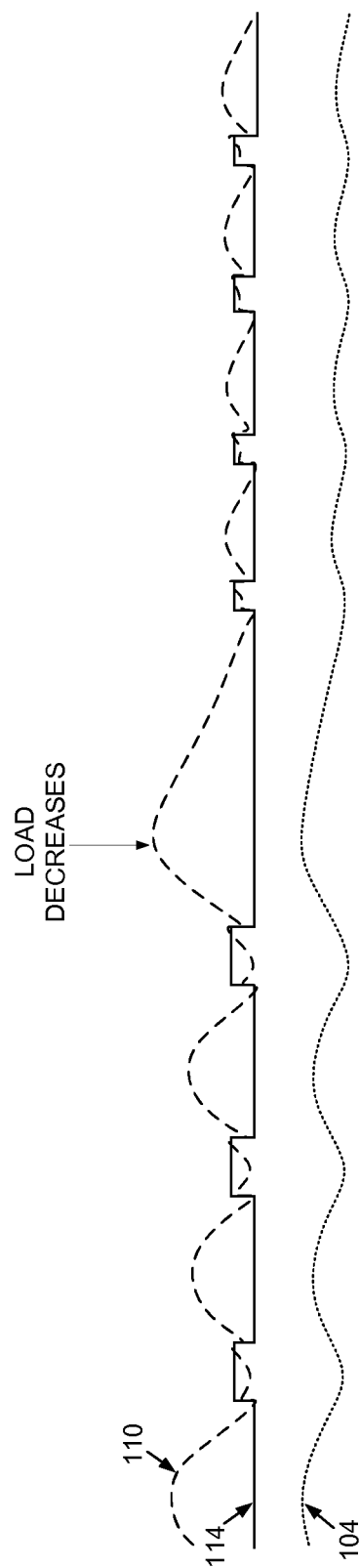
FIG. 11 shows example waveforms illustrating an embodiment of the present invention including the frequency of the oscillator signal, the frequency of the reference signal, and the regulated voltage supplied to the system circuitry.

FIG. 11 shows example waveforms illustrating an embodiment of the present invention including the frequency of the oscillator signal 110, the frequency of the reference signal 114, and the regulated voltage 104 supplied to the system circuitry 106. When the frequency of the oscillator signal 110 falls below the frequency of the reference signal 114, the control circuitry 124 decreases the number of delay elements in the ring oscillator 108 which effectively increases the frequency of the oscillator signal 110 as shown in FIG. 11. At the same time, the control circuitry 124 adjusts the divider value of the frequency generator 112 which increases the frequency of the reference signal 114 to be slightly higher than the frequency of the oscillator signal 110 as illustrated in FIG. 11. This causes the comparator 116 to turn on switch 118 of FIG. 10 to charge the charging element 122 and increase the supply voltage 104. When the frequency of the oscillator signal 110 exceeds the frequency of the reference signal 114, the control circuitry 124 increases the number of delay elements in the ring oscillator 108 which effectively decreases the frequency of the oscillator signal 110 as illustrated in FIG. 11. At the same time, the control circuitry 124 adjusts the divider value of the frequency generator 112 which decreases the frequency of the reference signal 114 to be slightly lower than the frequency of the oscillator signal 110 as illustrated in FIG. 11. This causes the comparator 116 to turn off switch 118 of FIG. 10 which eventually discharges the charging element 122 until the supply voltage 104 decreases to start another cycle. When the load decreases as shown in FIG. 11, the on time of switch 118 decreases which reduces the ripple voltage of the supply voltage 104.

Figure 12:
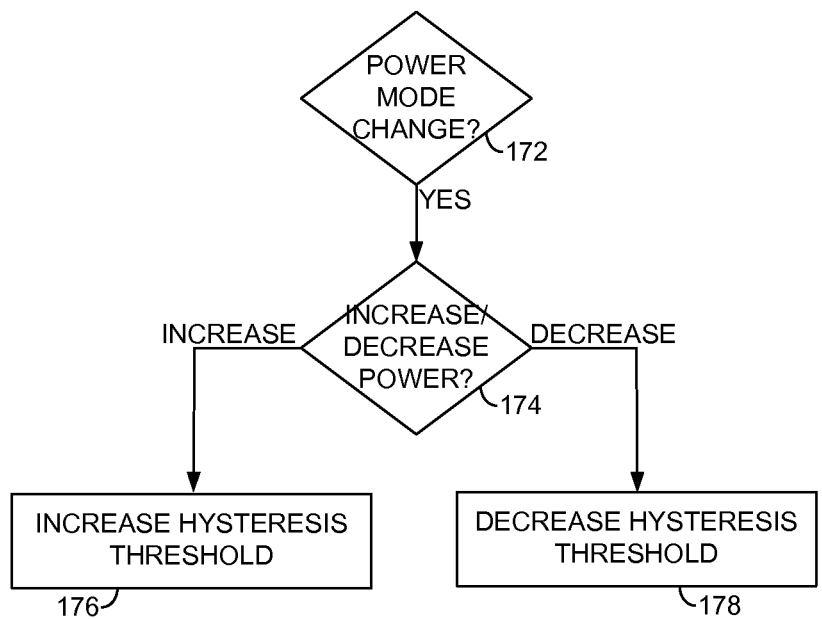
FIG. 12 is a flow diagram according to an embodiment of the present invention wherein prior to the power mode changing, a hysteresis threshold of the voltage regulator is adjusted to pre-compensate for the change in load current associated with the power mode changing.

FIG. 12 shows a flow diagram according to an embodiment of the present invention wherein prior to a power mode changing (step 172) which increases the current demand of the load (step 174), the hysteresis threshold is increased (step 176) to increase the on-time of the charging element. Similar to decreasing the state in FIG. 2B as described above, increasing the hysteresis threshold reduces the required voltage margin by reducing the supply voltage undershoot when the power mode changes. In another embodiment, prior to the power mode changing (step 172) which decreases the current demand of the load (step 174), the hysteresis threshold is decreased (step 178) to decrease the on-time of the charging element. Similar to increasing the state in FIG. 2B as described above, decreasing the hysteresis threshold reduces supply voltage overshoot when the power mode changes leading to a more efficient switching voltage regulator.

The hysteresis threshold may be adjusted using any suitable technique. In one embodiment, the hysteresis threshold is adjusted by adjusting the divider value of the frequency generator 112, and/or by adjusting the number of delay elements in the ring oscillator 108. In another embodiment shown in FIG. 9, the hysteresis threshold is adjusted by adjusting the value loaded into the counter 140 clocked by the reference signal 114 and/or by adjusting the value loaded into the counter 144 clocked by the oscillator signal 110. For example, the hysteresis threshold may be increased by decreasing the value loaded into the counter 140 clocked by the reference signal 114, and/or by increasing the value loaded into the counter 144 clocked by the oscillator signal 110.

Figure 13:
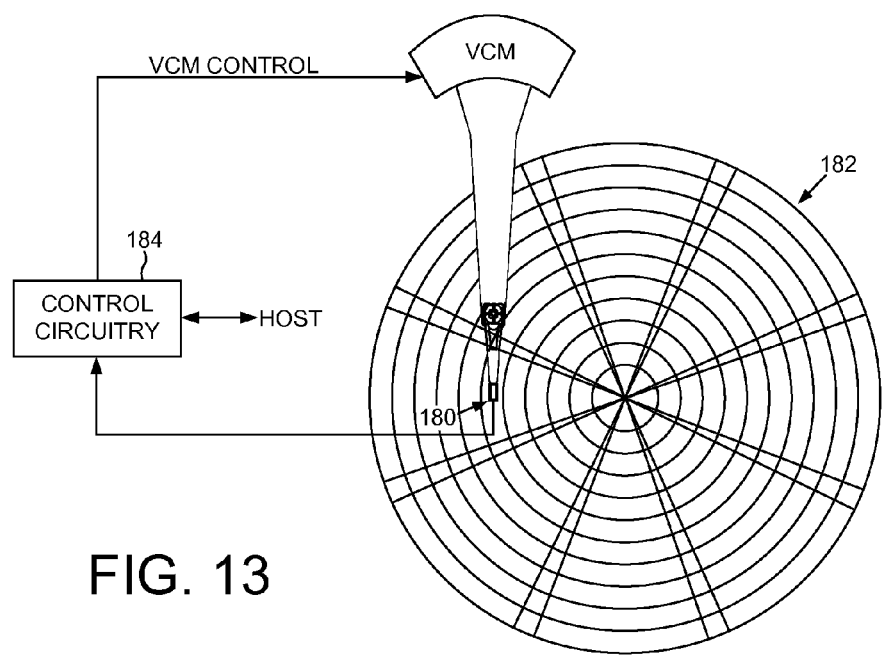
FIG. 13 shows a disk drive including control circuitry employing a switching voltage regulator according to an embodiment of the present invention.
Figure 14:
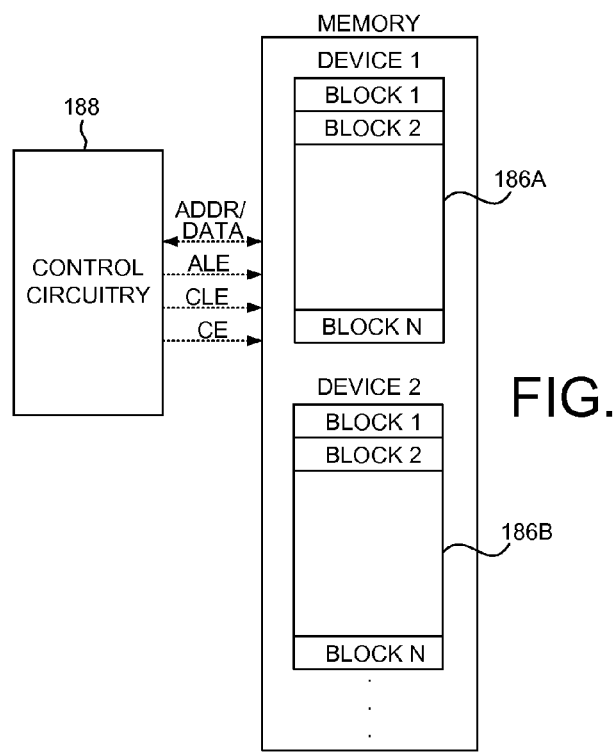
FIG. 14 shows a solid state drive including control circuitry employing a switching voltage regulator according to an embodiment of the present invention.

The switching voltage regulator of the present invention may be employed in any suitable device, such as in a data storage device. FIG. 13 shows a disk drive comprising a head 180 actuated over a disk 182 and control circuitry 184 including a switching voltage regulator described above according to an embodiment of the present invention. FIG. 14 shows a solid state drive comprising a plurality of non-volatile semiconductor memories 186A, 186B, etc., such as flash memories, and control circuitry 188 including a switching voltage regulator described above according to an embodiment of the present invention. The switching voltage regulator of the present invention may also be employed in any suitable consumer or industrial electronic device other than storage devices. For example, the switching voltage regulator may be employed in system circuitry for computers, cell phones, televisions, music players, or any other suitable device.

What is claimed is:

1. A switching voltage regulator operable to regulate a supply voltage to a load, the switching voltage regulator comprising:
    (a) a charging element operable to generate an output voltage;
    (b) switching circuitry coupled to the charging element; and
    (c) switch control circuitry operable to control the switching circuitry to configure the charging element during a cycle, including to charge the charging element for an on-time, discharge the charging element for a discharge time, and tristate the charging element for a tristate time, and further operable to:
        initialize the on-time to a first on-time;
        measure a first switch time comprising the first on-time and a first discharge time of a first cycle;
        measure a first tristate time of the first cycle;
        determine a first ratio of the first tristate time to the first switch time;
        compare the first ratio to a first ratio threshold;
        decrease the on-time to a second on-time when the first ratio exceeds the first ratio threshold; and
        prior to a power mode changing which increases the current demand of the load, increase the on-time.

2. The switching voltage regulator as recited in claim 1, wherein the control circuitry is further operable to increase the on-time to the first on-time.

3. The switching voltage regulator as recited in claim 1, wherein the control circuitry is further operable to increase the on-time one cycle before the power mode changes.

4. The switching voltage regulator as recited in claim 1, wherein prior to a power mode changing which decreases the current demand of the load the control circuitry is further operable to decrease the on-time to the second on-time.

5. The switching voltage regulator as recited in claim 4, wherein the control circuitry is further operable to decrease the on-time to the second on-time one cycle before the power mode changes.

6. A switching voltage regulator operable to regulate a supply voltage to system circuitry, the switching voltage regulator comprising:
    a ring oscillator operable to generate an oscillator signal representing a gate speed of a reference circuit in the system circuitry, wherein the ring oscillator comprises a plurality of delay elements connected in series;
    a frequency generator operable to generate a reference signal representing a target gate speed of the reference circuit, wherein a frequency of the reference signal is based on a divider value;
    a comparator operable to compare the oscillator signal to the reference signal;
    switching circuitry operable to charge a charging element in response to the comparison; and
    control circuitry operable to:
        adjust the number of delay elements in the ring oscillator and the divider value of the frequency generator to generate hysteresis in the comparison; and
        prior to a power mode of the system circuitry changing, adjust a hysteresis threshold for controlling a level of the hysteresis.

7. The switching voltage regulator as recited in claim 6, wherein the control circuitry is further operable to adjust the hysteresis threshold by adjusting the comparator.

8. The switching voltage regulator as recited in claim 7, wherein the control circuitry is further operable to adjust the hysteresis threshold by adjusting a counter clocked by the oscillator signal.

9. The switching voltage regulator as recited in claim 7, wherein the control circuitry is further operable to adjust the hysteresis threshold by adjusting a counter clocked by the reference signal.

10. The switching voltage regulator as recited in claim 7, wherein the control circuitry is further operable to adjust the hysteresis threshold by adjusting a first counter clocked by the oscillator signal and a second counter clocked by the reference signal.

11. A method of operating a switching voltage regulator operable to regulate a supply voltage to a load, the switching voltage regulator comprising a charging element operable to generate an output voltage, the method comprising:
    initializing an on-time of the charging element to a first on-time;
    measuring a first switch time comprising the first on-time and a first discharge time of a first cycle;
    measuring a first tristate time of the first cycle;
    determining a first ratio of the first tristate time to the first switch time;
    comparing the first ratio to a first ratio threshold;
    decreasing the on-time to a second on-time when the first ratio exceeds the first ratio threshold; and
    prior to a power mode changing which increases the current demand of the load, increasing the on-time.

12. The method as recited in claim 11, further comprising increasing the on-time to the first on-time one.

13. The method as recited in claim 11, further comprising increasing the on-time one cycle before the power mode changes.

14. The method as recited in claim 11, wherein prior to a power mode changing which decreases the current demand further comprising decreasing the on-time to the second on-time.

15. The method as recited in claim 14, further comprising decreasing the on-time to the second on-time one cycle before the power mode changes.

16. A method of operating a switching voltage regulator operable to regulate a supply voltage to system circuitry, the switching voltage regulator comprising:
    a ring oscillator operable to generate an oscillator signal representing a gate speed of a reference circuit in the system circuitry, wherein the ring oscillator comprises a plurality of delay elements connected in series;

a frequency generator operable to generate a reference signal representing a target gate speed of the reference circuit, wherein a frequency of the reference signal is based on a divider value;

a comparator operable to compare the oscillator signal to the reference signal;

switching circuitry operable to charge a charging element in response to the comparison; and the method comprising:

adjusting the number of delay elements in the ring oscillator and the divider value of the frequency generator to generate hysteresis in the comparison; and prior to a power mode of the system circuitry changing, adjusting a hysteresis threshold for controlling a level of the hysteresis.

17. The method as recited in claim 16, further comprising adjusting the hysteresis threshold by adjusting the comparator.

18. The method as recited in claim 17, further comprising adjusting the hysteresis threshold by adjusting a counter clocked by the oscillator signal.

19. The method as recited in claim 17, further comprising adjusting the hysteresis threshold by adjusting a counter clocked by the reference signal.

20. The method as recited in claim 17, further comprising adjusting the hysteresis threshold by adjusting a first counter clocked by the oscillator signal and a second counter clocked by the reference signal.

* * * * *